United States Patent [19]

Zaderej et al.

[11] 4,042,852
[45] Aug. 16, 1977

[54] FLUORESCENT LAMPS WITH HIGH FREQUENCY POWER SUPPLY WITH INDUCTIVE COUPLING AND SCR STARTER

[75] Inventors: George Zaderej; Andrew Zaderej, both of South Bend, Ind.

[73] Assignee: Unitron Corporation, Elkhart, Ind.

[21] Appl. No.: 700,578

[22] Filed: June 28, 1976

[51] Int. Cl.² .................. H05B 41/04; H05B 41/29
[52] U.S. Cl. .................................. 315/97; 315/101; 315/105; 315/206; 315/219; 315/DIG. 5; 315/DIG. 7
[58] Field of Search ............... 315/DIG. 7, 219, 101, 315/105, 206, DIG. 5, 97, 221

[56] References Cited

U.S. PATENT DOCUMENTS 3,396,307    8/1968    Campbell ........................ 315/221

Primary Examiner—Craig E. Church
Assistant Examiner—Charles F. Roberts
Attorney, Agent, or Firm—Y. Jayachandra

[57] ABSTRACT

A high frequency power supply with inductive coupling and a SCR starter to light two fluorescent lamps is described. It supplies high frequency square waves to the fluorescent lamp for improved light output, efficiency and stability of operation. The rectified line voltage from a full wave rectifier is fed via a SCR starter to two transistors that form an inverter circuit. The inverter circuit is coupled to a ferrite core autotransformer. The secondary windings of the autotransformer are used to heat the filaments of the electrodes of the fluorescent lamp, and to form a reactive coupling along with inductors for stabilizing the arc discharge of the fluorescent lamp.

10 Claims, 3 Drawing Figures

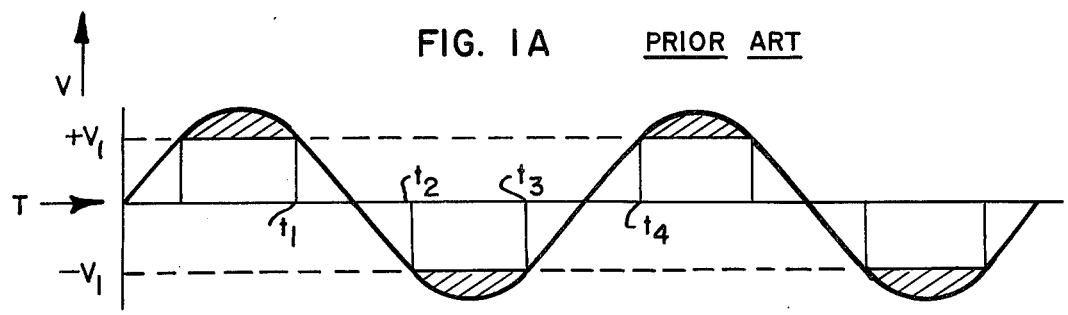
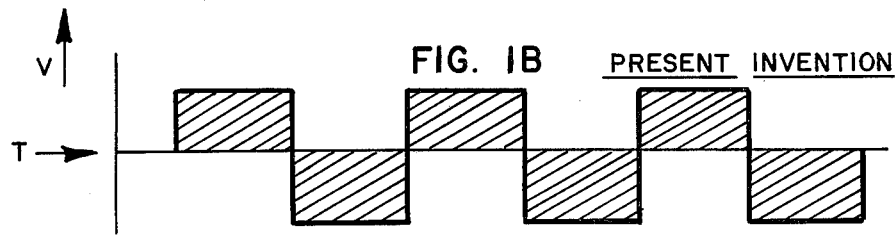
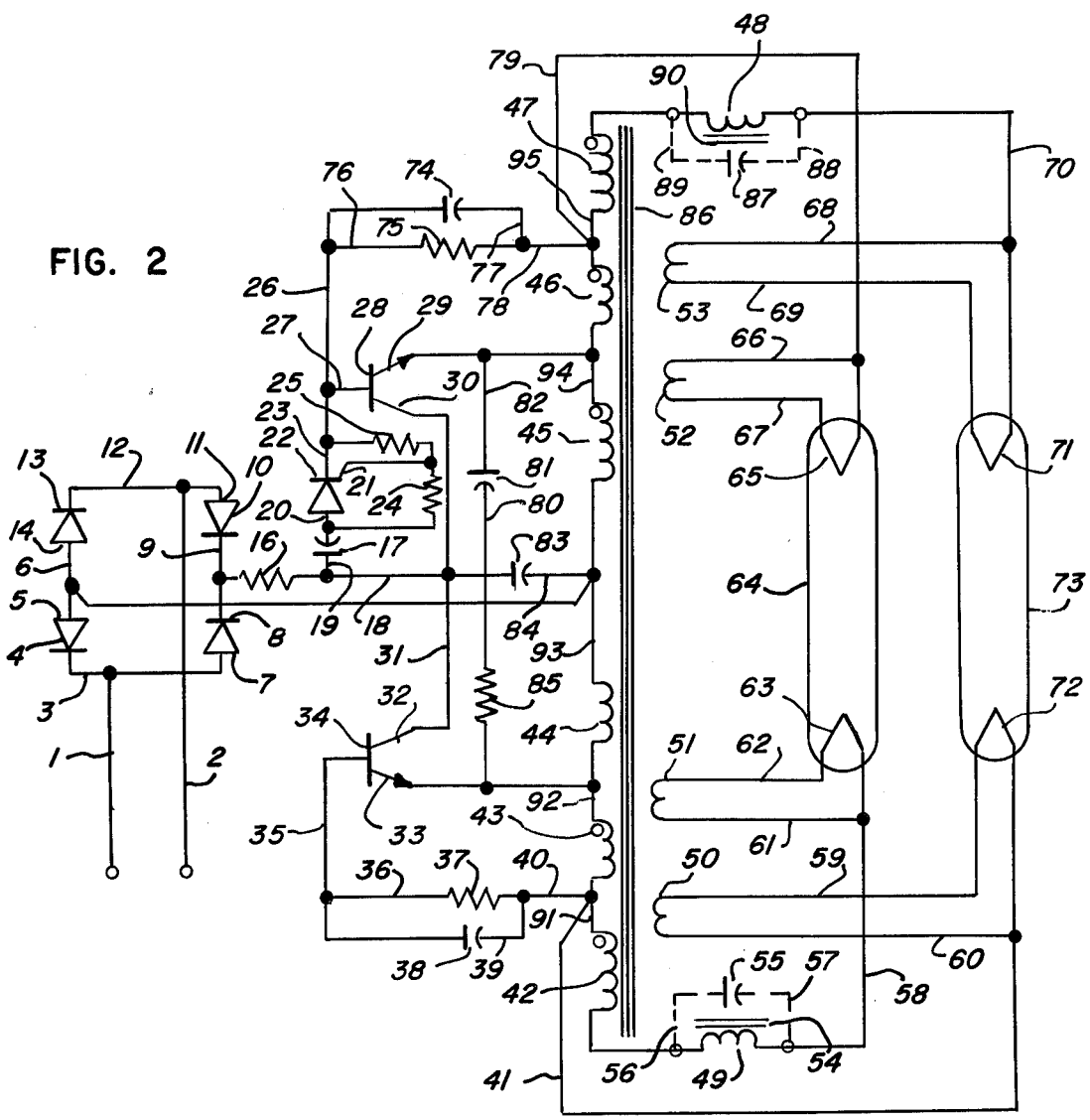

FLUORESCENT LAMPS WITH HIGH FREQUENCY POWER SUPPLY WITH INDUCTIVE COUPLING AND SCR STARTER

CROSS-REFERENCES TO RELATED APPLICATIONS

1. Application Ser. No. 652,469, of A. Zaderej for "HIGH FREQUENCY ELECTRONIC CIRCUIT TO START AND LIGHT A FLUORESCENT LAMP", filed Jan. 26, 1976, and assigned to the same assignee as this application now abandoned.

2. Application Ser. No. 646,986, of A. Zaderej for "HIGH FREQUENCY HIGH VOLTAGE POWER SUPPLY FOR A FLUORESCENT LAMP", filed Jan. 7, 1976, and assigned to the same assignee as this application now abandoned.

BACKGROUND OF THE INVENTION

1. Field of the Invention

This invention pertains to an improved electronic circuit to start and light a fluorescent lamp utilizing a SCR starter and inductive coupling for stable high frequency square wave input into the lamp. The electronic circuit described herein is capable of starting fluorescent lamps of different sizes and makes.

2. Description of the Prior Art

In the prior art, basic electric circuits for operation of fluorescent lamps include preheat, instant-start and rapid-start circuits. Each includes a ballast, which provides starting voltage, and limits current.

In preheat circuit, a starting switch, usually an automatic starter is used to heat the electrodes. The most common starter employs a tiny argon glow tube with one fixed electrode and one electrode made of a bent bimetallic strip. In the instant-start circuit, the ballast voltage is much higher than in the preheat circuit. The rapid-start ballast has transformer windings that continiously provide the desired voltage and current for electrode heating to release enough electrons to arc from the voltage of the main windings. The combination of heat and moderately high voltage permits quick lamp starting with smaller ballasts than those for instant-start lamps, reduces flicker associated with preheat lamps.

These circuits are essentially low frequency, that is same as line frequency sine wave power supplies, with the disadvantages of flicker, audible hum and fractional use of sine wave voltage for light generation as shown in FIG. 1a, with considerable idle time of $t_1$ to $t_2$ as indicated, and consequently less efficient with annoying flicker. These circuits use bulky transformers, capacitors and inductors for proper start and stabilization of the arc discharge, and thereby they are associated with the problem of more power losses associated with copper and iron. These circuits also give rise to considerable polarization at electrodes of the lamp due to low frequency alternating voltages, which result in low life, reduced light output and degraded performance of the lamp. Furthermore, these circuits are not universal, that is, they can not handle defferent sizes and shapes of lamps, because of close matching requirements of reactances at low frequencies.

High frequency circuits have been known in the prior art, designed to avoid some of the aforecited disadvantages inherent with low frequency circuits. They operate on a.c. circuits with 50 to 60 Hz input and 360 to 3,000 Hz output, and uses various types of frequency converters to obtain high frequency power (Refer: R. D. Burham, "High-frequency Lighting", Architectural Record, Dec. 1957). Motor generator sets are most common, but static magnetic converters and converters using transistors have been developed. (Refer: J. H. Campbell & E. G. Downie, "Magnetic Frequency Multipliers For High Frequency Operation of Fluorescent Lamps", Electrical Construction And Maintenance, Nov. 1954, p. 89. and "Transistorized High-frequency Systems Developed for Lighting", Architectural Record, Jan. 1958).

The high frequency circuits available for fluorescent lamps, in the prior art, are complex and expensive. They are less efficient and less reliable. Furthermore, they are not universal, i.e., each type of fluorescent lamp requires its own matched circuit. Therefore they are not popular.

SUMMARY OF THE INVENTION

The primary object of this invention is to employ the disclosed electronic circuit, which utilizes inductive coupling to fluorescent lamps, that will allow one to achieve 30 to 50 % higher light output in a fluorescent lamp for extended period of times that was not hitherto possible, and thereby effect an energy saving correspondingly of about 30 to 50%.

It is also an object of the invention to provide an electronic circuit configuration for generation of high frequency power using an efficient SCR starter to extend the life of the transistors of the inverter for generation of high frequency power to suit the requirements of a fluorescent lamp of preheated cathode construction, which do not suffer from the heretofore mentioned disadvantages, and which can be used for different kinds, sizes and numbers of lamps.

Another object of the invention is to achieve smaller resistive and magnetic losses (copper and iron losses) than the prior art, by using very little copper and magnetic core, and thereby make the circuit less expensive and light. The higher the frequency, the fewer the windings required to achieve the given induction, and therefore lesser copper and magnetic core are employed. With lesser copper and magnetic cores, the power losses will also be lesser.

Another object of the invention is to employ sharp square wave pulses of more symmetrical shape obtained by the help of the SCR starter for continious lighting of the lamp, that has negligible idle times.

Another object of the invention is to use sharp square wave pulses for continious lighting of the lamp, with no appreciable idle times, by using inductive coupling along with the SCR starter. In ordinary sinusoidal waves, such as those used in the prior art, fluorescent lamp is actuated for the period as shown by the shaded regions, as illustrated in FIG. 1a, because arc discharge can only occur above a certain thresh-hold voltage $v_1$ as indicated, below which no lighting is possible. Therefore, there is no lighting in the periods of $(t_1-t_2)$, $(t_3-t_4)$ and so on. Square wave pulses, as used in this invention, do not have idle times, since lighting is continious, as shown schematically in FIG. 1b, where shaded regions indicate active lighting regions. Therefore, light efficiency is higher in the present invention than in the prior art.

Another object of the invention is to use the electronic circuitry to heat the electrodes of the fluorescent lamp from the secondary windings of the ferrite core autotransformer consisting of a very small number of turns as for example three-fourths of a turn, to induce thermionic emission, for reduction of starting voltage of the fluorescent lamp. The thermionic emission allows one to utilize moderate voltages for starting the fluorescent lamp.

It is another object of the invention to make the distortion factor close to unity. Distortion factor arises because of negative voltage-current characteristic of the fluorescent lamp, in which if an alternating current is applied, the voltage is distorted. If the lamp is constructed symmetrically, the same voltage pattern is repeated with opposite sign during the next half cycle. For higher frequencies of square wave current wave forms, this distortion factor is negligible, because more rapid current changes alter the arc discharge characteristics. The ionization conditions in the gas discharge can no longer follow the variations of the current at sufficiently high frequencies, and henceforth, the voltage wave forms closely approximate to the current wave forms. The SCR starter switch aids to attain the distortion factor close to unity, by way of its quick start capabilities with no assymmetry.

Still another object of the invention is to increase the light output of the lamp, by reducing "anode fall", (Refer: M. Koedam and W. Verwey, "The Influence of the Supply Frequency on the Luminious Efficiency of Fluorescent Lamp", published in the Proceedings of the Seventh International Conference on Ionization Phenomena in Gases, Beogard, 1965, North-Holland Publishing Company, Amsterdam, Netherlands).

Still another object of the invention is to utilize current wave forms in the ultrasonic frequency range of about 24 KHz, so as to avoid hum and buzzing noises that are common in current lamps. The noise level is reduced to a significant level in this invention, because of higher efficiency in converting high frequency currents to light output.

Still further object of the invention is to employ inductive coupling along with the ferrite core autotransformer for current stabilization, for extended periods of time, and to avoid capacitive coupling that needs high-tolerance circuit elements. Inductive coupling limits current distortion in a more simple and stable manner than capacitive coupling.

These and other objectives will become more apparent after considering the following detailed disclosure.

The invention accordingly comprises a high frequency power supply with inductive coupling and a SCR starter with a ferrite core autotransformer, for starting and lighting a fluorescent lamp having the construction, combination of elements and arrangement of parts that are exemplified in the following detailed disclosure, the scope of which will be stated in the appended claims.

BRIEF DESCRIPTION OF THE DRAWINGS

For a complete understanding of the nature and objects of the present invention, reference should be made to the following detailed description taken in connection with the accompanying drawings wherein:

FIG. 1a is a schematic presentation of sinusoidal wave forms of current used in the prior art for lighting, depicting the unused power or idle times at tail ends of the sine wave half cycles, and shaded portion representing the usable energy for lighting.

FIG. 1b shows schematic wave forms of current obtained from the present inventive circuit, which depicts comparitively the total utilization of electric current for lighting, with no idle times, shown as shaded area, scaled to show salient features only rather than actual magnitudes of the current and time.

FIG. 2 is a detailed circuit diagram of the fluorescent lamp hf power supply with inductive coupling and a SCR starter with ferrite core autotransformer, depicting the manner in which the circuit components are interconnected to the fluorescent lamps.

DETAILED DESCRIPTION OF THE PREFERRED EMBODIMENT

Now referring to FIG. 2, the detailed description of the preferred embodiment is explained.

A standard line voltage of about 110 or 230 volts, ac, ± 10%, 50 to 60 Hz from a source not shown, is fed through lines 1 and 2 to a full wave rectifier, joining lines 3 and 12 respectively. The anode 5 and the cathode of the diode 4 are connected by lines 6 and 3 to the anode 14 and the anode 7 of the diodes as shown. The cathode 8 is joined by line 9 to the cathode of the diode 10. The anode 11 of the diode 10 is connected to line 12 that interconnects the cathode 13 of the diode as shown.

The SCR starter consists of a capacitor 17, resistors 24 and 25 and the SCR as shown. The cathode 22 of the SCR is tied to the resistor 25 by line 23. The gate 21 of the SCR is joined to the resistors 24 and 25 as shown. The other end of the resistor 24 is connected to the anode of the SCR, which is interconnected to the capacitor 17. The values of the resistors 24 and 25 are about 25 and 56 kilo-ohms respectively. The SCR is C103B type commercially available from several semiconductor companies. The capacitor 17 has a value of about 0.02 microfarads.

One side of the resistor 16 is connected to a line 9 and the other side of the resistor to a line 18 that joins a capacitor 83. The other side of the capacitor 83 is connected to line 84 and to line 93 of the ferrite core autotransformer 86. Line 6 is joined to line 93 by the connection as shown. The resistor 16 has a value of about 1 ohm and the capacitor 83 has a value of about 2 micro farads.

The ferrite core autotransformer has a high frequency ferrite core pot made of lead zirconate, with windings 42, 43, 44, 45, 46 and 47 joined by lines 91, 92, 93, 94 and 95 respectively. Windings Windings 42 and 47 have about 40 turns each and are wound with AWG No. 26 gauge wire. Windings 44 and 45 are each thirty turns and they are wound with AWG No. 21 gauge wire. Windings 42 to 47 consist primary windings of the ferrite core autotransformer 86. 50, 51, 52 and 53 are the secondary windings of the ferrite core autotransformer and their function is to heat the filaments of the electrodes rather than to achieve transformer action. They are each three quarter turn and wound with AWG No. 21 wire.

The collectors 32 and 30 of the two NPN transistors are interconnected together by the line 31. Emitter 33 of the NPN transistor is connected to line 92 and emitter 29 of the other NPN transistor is interconnected to line 94. Emitters 33 and 29 are joined together through the resistor 85 and the capacitor 81 by lines 82 and 80 as shown. Base 34 of the NPN transistor is connected to line 35 that joins line 36. One side of the resistor 37 is connected to the line 36 and the other side to the line 40 that interconnects 91 as shown. One end of the capacitor 38 is connected to the line 39 that joins the line 40, and the other end of the capacitor 38 is connected to the line 35. The values of the capacitors 81 and 38 are 0.0062 and 1 microfarad respectively. Resistors 37 and 85 have values of about 5 and 10 ohms respectively.

The base 28 of the NPN transistor is connected by a line 27 that connects to a line 26 which in turn joins a line 23. One side of the capacitor 74 is interconnected to the line 26 and the other side to the line 77 as shown. One end of the resistor 75 is connected to the line 76 and the other end to the line 77 and to the line 95 as shown. Resistor 75 has a value of about 5 ohms with 7 watt rating. The capacitor 74 has a value of about 1 microfarad.

A line 79 is connected to the line 95 and to the electrode 65 of the fluorescent lamp 64. A line 67 interconnects the electrode to the winding 52 of the ferrite core autotransformer. The other side of the winding 52 is connected to the line 79. A line 41 is connected to the line 91 and to the electrode 72 of the fluorescent lamp 73. One side of the winding 50 is connected to the electrode 72 by a line 59, and the other side by a line 60 that joins the line 41.

One side of the inductor 48 with core 90, is joined to a line 70 that joins the electrode 71 of the fluorescent lamp 73 and the other side is connected to the winding 47 of the ferrite core autotransformer.

A capacitor 87 is joined parallel to the inductor 48 by lines 88 and 89 as shown. Similarly one end of the inductor 49 with the core 54 is connected to the electrode 63 of the fluorescent lamp 64 and the other end to the winding 42 of the ferrite core autotransformer. Windings 42 and 47 are the outer windings of the ferrite core autotransformer. A capacitor 55 is connected parallel to the inductor 49 by lines 56 and 57 as shown. The values of the inductors 48 and 49 are each 15 microhenries. The values of the capacitors 55 and 87 are each about 10 picofarads.

One end of the winding 53 is connected to the electrode 71 and the other end to the line 68. Similarly one end of the winding 50 is connected to a line 59 that joins the electrode 72 of the fluroescent lamp and the other end to the line 60. The line 60 joins the line 41 and the line 68 joins the line 70.

One end of the winding 51 is connected to the line 62 that joins the electrode 63 of the fluorescent lamp, and the other end to the line 61 that joins the line 58 which is connected to the inductor 49. Similarly one end of the winding 52 is connected to the line 67 that is attached to the electrode 65 of the fluorescent lamp, and the other end to the line 66 that is joined to the line 79.

Referring to FIG. 2 detailed as above, the operation of the circuit is described below.

The rectified line voltage from the full wave rectifier is fed to the storage capacitor 83, with resistor 16 acting as a current limiting resistor to prevent rapid charging. The value of the resistor has to be carefully selected so as to avoid rapid charging of the capacitor 83 that may result in destruction of the full wave rectifier.

Current flows to the SCR switch from the capacitor 17 until the said capacitor is fully charged. Current stops flowing into the SCR switch after the full charging of the capacitor 17. The initial flow of current through the SCR switch goes to the base 28 of the NPN transistor. This base current turns on the said NPN transistor which allows the current to flow through the collector and the emitter of the said NPN transistor and through the inner primary winding 45 of the ferrite core autotransformer.

Passage of current current through the winding 45 induces positive voltage through the inner primary winding 46 of the ferrite core autotransformer which acts as a feedback winding, turning the said NPN transistor completely into saturation.

When the rate of current change ($di/dt$) stops and starts to be negative, a negative voltage is induced through the winding 45 which turns the said NPN transistor to completely off condition. Simultaneously a positive voltage is induced into the primary winding 43 of the ferrite core autotransformer which acts as a feedback winding, which turns the other NPN transistor with base 35 to on condition.

When current flows through this other NPN transistor through the inner primary winding 44, more positive voltage is induced through the feedback winding 43 driving this transistor into complete saturation. Once the positive rate of change of the current ($di/dt$) stops annd becomes negative in the winding 44, a negative voltage is induced by feedback in the winding 43 to turn this other transistor completely into off condition, and a positive voltage is induced by feedback into the winding 46 to turn the NPN transistor with base 27 to on condition. This cycle of events continiously repeat at the characteristic high frequency rate, supplying high frequency square wave pulses to the fluorescent lamps through the inductive coupling.

When the inverter consisting of the said two NPN transistors is oscillating, voltage is induced in outer primary windings 42 and 47 of the ferrite core autotransformer, which are connected in series to the primary windings of the said ferrite core autotransformer, so that the voltages from one set of the windings 45, 46 and 47 are additive; and the voltages from the other set of the windings 42, 43 and 44 are additive. Fluorescent lamp 64 is connected to 47 and 43 through ballast load 49. Fluorescent lamp 73 is connected to winding 42 and through winding 46 through ballast load 48.

Windings 52 and 51 heat the filaments of the electrodes of the fluorescent lamp 64 and windings 50 and 53 heat the filaments of the electrodes of the fluorescent lamp 73.

The ferrite core autotransformer 86 has a very high efficiency with low weight. It is difficult to start the circuit with this ferrite core autotransformer with conventional starters, because the starting current and the voltage are limited, which results in reduced mutual coupling, creating the difficulty of obtaining the required voltage spike to start the circuit. By utilizing the SCR starter as described before this difficulty is surmounted. The conventional starters of the prior art are usually simple capacitors and (or) resistors with diodes, which usually create assymmetry in voltage wave forms. If a transistor is used instead of the SCR as employed in the inventive circuit, the transistor in general can not handle high powers required to light the fluorescent lamps with adequate efficiency. This also gives rise to assymmetry in voltage wave forms. The inventive SCR starter described herein is therefore considered to be efficient, reliable and novel than the conventional starters.

Inductors 48 and 49 reactively couple the fluorescent lamps 73 and 64 respectively with the inventive circuit. If a capacitive coupling is used instead of the inductive coupling, the life of the fluorescent lamps may not be high because with higher frequency, lower reactance results and the fluorescent lamps draw more and more current and eventually burn in course of time, since the capacitive reactance (XC) and frequency F is inversely related as per $XC = \frac{1}{2}\pi FC$, where C is capacitance.

Inductive coupling does not have this disadvantage because inductive reactance XL is directly related to the frequency as per $XL = 2\pi FL$ where $L$ is value of the inductance.

While in accordance with the provisions and statutes, there has been described and illustrated the best form of the invention known, certain changes may be made to the elements described without departing from the spirit of the invention as set forth in the appended claims and that in some cases, certain features of the invention may be used to advantage without the corresponding use of other features.

Having described the invention, what is claimd as new and novel and for which it is desired to secure Letters Patent is:

1. A high frequency power supply with inductive coupling and a SCR starter to light a fluorescent lamp, comprising:
   a. a full wave rectifier;
   b. a SCR starter;
   c. a ferrite core autotransformer
   d. an inverter consisting of two NPN transistors whose collectors are tied together and whose emitters are connected to the primary windings of the said ferrite core autotransformer;
   e. a fluorescent lamp connected through an inductive coupling to the output of the said high frequency power supply; and
   f. the electrodes of the said fluorescent lamp connected to the secondary windings of the said ferrite core autotransformer, for heating.

2. A high frequency power supply with inductive coupling and a SCR starter to light a fluorescent lamp as claimed in claim 1, wherein the full wave rectifier is connected to the SCR starter by a resistor and a capacitor.

3. A high frequency power supply with inductive coupling and a SCR starter to light a fluorescent lamp as claimed in claim 1, wherein the SCR starter has a capacitor connected to the anode of the SCR and a resistor connected to the gate of the SCR.

4. A high frequency power supply with inductive coupling and a SCR starter to light a fluorescent lamp as claimed in claim 1, wherein the inverter consisting of two NPN transistors whose collectors are tied together and whose emitters are connected to the primary windings of the said ferrite core autotransformer, and a resistor and a capacitor connected in series across the said emitters.

5. A high frequency power supply with inductive coupling and a SCR starter to light a fluorescent lamp as claimed in claim 1, wherein the SCR starter has a capacitor of about 0.02 microfarads value connected to the anode of the SCR; a 56 kilo-ohm resistor connected across the gate and the anode of the said SCR; and a 1 kilo-ohm resistor connected to the cathode of the said SCR.

6. A high frequency power supply with inductive coupling and a SCR starter to light a fluorescent lamp as claimed in claim 1, wherein the cathode of the SCR starter is connected to the base of the NPN transistor; and the outer primary winding of the ferrite core autotransformer is interconnected to the cathode of the SCR of the said SCR starter through a resistor and a capacitor.

7. A high frequency power supply with inductive coupling and a SCR starter to light two fluorescent lamps as claimed in claim 1, wherein the ferrite core autotransformer has six windings on the primary side, and four windings on the secondary side with three quarter turn each, and the said four windings of the secondary side are connected to the electrodes of said two fluorescent lamps.

8. A high frequency power supply with inductive coupling and a SCR starter to light two fluorescent lamps as claimed in claim 1, wherein the outer primary windings of the ferrite core autotransformer are connected to the electrodes of said two fluorescent lamps.

9. A high frequency power supply with inductive coupling and a SCR starter to light two fluorescent lamps as claimed in claim 1, wherein the bases of the two NPN transistors are connected through resistors to the outer primary windings of the ferrite core autotransformer, and the emitters of the said two NPN transistors are connected to the inner primary windings of the said ferrite core autotransformer.

10. A high frequency power supply with inductive coupling and a SCR starter to light two fluorescent lamps as claimed in claim 1, wherein the outer two primary windings of the ferrite core autotransformer are forty turns each, the second inner two primary windings are one turn each, and the center two primary windings are 30 turns each.

* * * * *